US012568194B2

(12) United States Patent
Timonen

(10) Patent No.: US 12,568,194 B2
(45) Date of Patent: Mar. 3, 2026

(54) GAZE AND DEPTH BASED CAMERA FOCUSING

(71) Applicant: Varjo Technologies Oy, Helsinki (FI)

(72) Inventor: Ville Timonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 352 days.

(21) Appl. No.: 18/498,205

(22) Filed: Oct. 31, 2023

(65) Prior Publication Data

US 2025/0142037 A1 May 1, 2025

(51) Int. Cl.
*H04N 13/128* (2018.01)
*G06F 3/01* (2006.01)
*H04N 13/271* (2018.01)
*H04N 13/383* (2018.01)

(52) U.S. Cl.
CPC ........... *H04N 13/128* (2018.05); *G06F 3/013* (2013.01); *H04N 13/271* (2018.05); *H04N 13/383* (2018.05)

(58) Field of Classification Search
CPC .. H04N 13/128; H04N 13/383; H04N 13/271; G06F 3/013
USPC ......................................................... 382/154
See application file for complete search history.

(56) References Cited

U.S. PATENT DOCUMENTS 11,652,976 B1 * 5/2023 Ollila ................... H04N 23/676
 348/51
12,003,691 B1 * 6/2024 Oh ........................ H04N 23/675

2015/0003819 A1 * 1/2015 Ackerman ............. G03B 13/36
 396/51
2019/0369719 A1 * 12/2019 Klingström .......... G02B 27/017
2021/0089121 A1 * 3/2021 Rönngren .......... G02B 27/0093
2023/0213755 A1 * 7/2023 Ollila ................. G02B 27/0093
 348/340

FOREIGN PATENT DOCUMENTS

WO 2023126560 A1 7/2023

OTHER PUBLICATIONS

European Patent Office, Extended European Search Report, Application No. 24203970.9, Mailed Mar. 21, 2025, 5 pages.

* cited by examiner

*Primary Examiner* — Gabriel I Garcia
(74) *Attorney, Agent, or Firm* — Ziegler IP Law Group, LLC.

(57) ABSTRACT

Disclosed is computer-implemented method including marching first ray and second ray, along first gaze direction and second gaze direction that are estimated using gaze-tracking means, from given viewpoint into depth map, to determine first optical depth and second optical depth corresponding to first eye and second eye, respectively; calculating gaze convergence distance, based on first gaze direction and second gaze direction; detecting whether first optical depth lies within predefined threshold percent from second optical depth; and when it is detected that first optical depth lies within predefined threshold percent from second optical depth, selecting given focus distance as an average of at least two of: first optical depth, second optical depth, gaze convergence distance; and employing given focus distance for capturing given image using at least one variable-focus camera.

15 Claims, 5 Drawing Sheets

GAZE AND DEPTH BASED CAMERA FOCUSING

TECHNICAL FIELD

The present disclosure relates to computer-implemented methods. Moreover, the present disclosure relates to systems.

BACKGROUND

Typically, for applications related to mixed reality, a high-quality see-through video is required. However, cameras having a fixed focus fail to provide an optical performance and a deep enough depth-of-field required to produce the high-quality see-through video. Therefore, cameras having variable focus that adjust to various distances are used for the applications related to mixed reality.

The present solutions involve the use of cameras having variable focus where correct focus distance is found by trying out a plurality of different focus distances in a quick succession, and selecting a focus distance that shows a highest frequency detail in a region-of-interest in which a user is looking at. Moreover, in some solutions even the region-of-interest needs to be selected manually by tapping over a display screen. Thus, the present solutions require trial and error over multiple frames to select the correct focus distance, which results in latency and visual flickering while finding the correct focus distance, and thus, provide an unpleasant viewing experience for immersive applications related to the mixed reality.

Therefore, in light of the foregoing discussion, there exists a need to overcome the aforementioned drawbacks.

SUMMARY

The aim of the present disclosure is to provide a computer-implemented method and a system to adjust camera focusing in Mixed Reality Head Mounted Displays (HMDs). The aim of the present disclosure is achieved by a computer-implemented method and a system for gaze and depth-based camera focusing in Mixed Reality HMDs as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
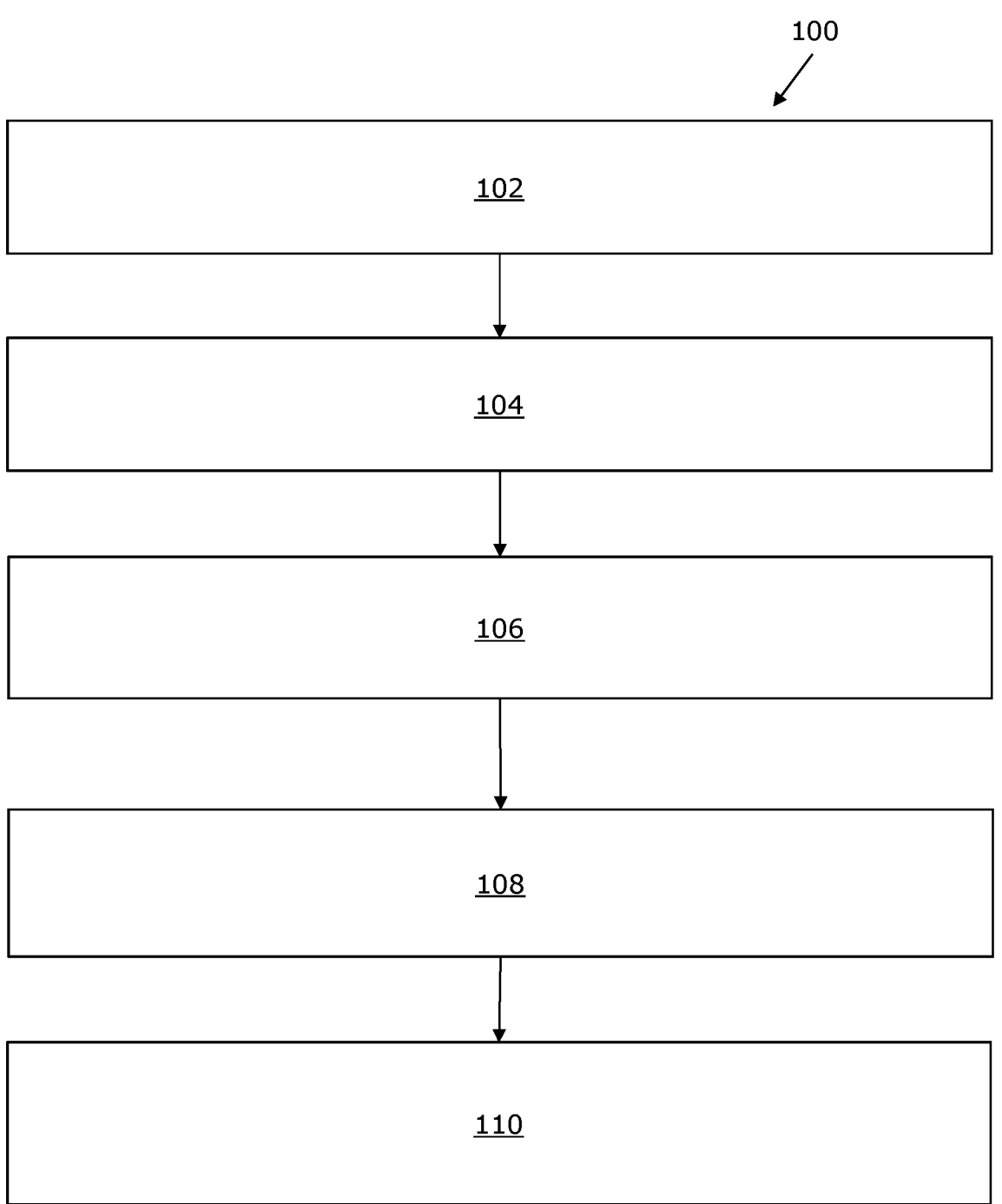
FIG. 1 is an illustration of a flowchart depicting steps of a computer-implemented method, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a computer-implemented method comprising:

marching a first ray and a second ray, along a first gaze direction and a second gaze direction that are estimated using a gaze-tracking means, from a given viewpoint into a depth map, to determine a first optical depth and a second optical depth corresponding to a first eye and a second eye, respectively;

calculating a gaze convergence distance, based on the first gaze direction and the second gaze direction;

detecting whether the first optical depth lies within a predefined threshold percent from the second optical depth; and when it is detected that the first optical depth lies within the predefined threshold percent from the second optical depth, selecting a given focus distance as an average of at least two of: the first optical depth, the second optical depth, the gaze convergence distance; and employing the given focus distance for capturing a given image using at least one variable-focus camera.

The present disclosure provides an aforementioned computer-implemented method. The computer-implemented method significantly improves an accuracy and efficiency of selecting the given focus distance to be employed for the at least one variable-focus camera. Moreover, the computer-implemented method succeeds in reducing a latency or visual flickering in mixed reality applications based on the correct and efficient selection of the given focus distance.

In a second aspect, the present disclosure provides a system comprising:

at least one variable-focus camera a processor configured to:

march a first ray and a second ray, along a first gaze direction and a second gaze direction that are estimated using a gaze-tracking means, from a given viewpoint into a depth map, to determine a first optical depth and a second optical depth corresponding to a first eye and a second eye, respectively;

calculate a gaze convergence distance, based on the first gaze direction and the second gaze direction;

detect whether the first optical depth lies within a predefined threshold percent from the second optical depth; and when it is detected that the first optical depth lies within the predefined threshold percent from the second optical depth, select a given focus distance as an average of at least two of: the first optical depth, the second optical depth, the gaze convergence distance; and employ the given focus distance for capturing a given image using the at least one variable-focus camera.

The present disclosure provides an aforementioned system. The system significantly improves an accuracy and efficiency of selecting the given focus distance to be employed for the at least one variable-focus camera. Moreover, the system succeeds in reducing a latency or visual flickering in mixed reality applications based on the correct and efficient selection of the given focus distance.

Throughout the present disclosure, the term "first eye" refers to a given eye selected from amongst the pair of eyes of a user. Throughout the present disclosure, the term "second eye" refers to another eye selected from amongst the pair of eyes of the user, other than the first eye. Throughout the present disclosure, the term "first gaze direction" refers to that direction in which the first eye of the user is looking or gazing at from the given viewpoint. Throughout the present disclosure, the term "second gaze direction" refers to that direction in which the second eye of the user is looking or gazing at from the given viewpoint. Notably, the first gaze direction and the second gaze direction are indicative of a gaze region towards which the user is looking or gazing at from the given viewpoint. Throughout the present disclosure, the term "given viewpoint" refers to a specific position and/or orientation of user's head from which the first eye of the user is gazing in the first direction and the second eye of the user is gazing in the second direction. Throughout the present disclosure, the term "gaze-tracking means" refers to specialized equipment for detecting and/or following gaze of the first eye and the second eye. The gaze-tracking means could be implemented as contact lenses with sensors, cameras monitoring a position, a size and/or a shape of a pupil of the first eye and the second eye, and the like. The gaze-tracking means are well-known in the art. It will be appreciated that gaze-tracking data is collected repeatedly by the gaze-tracking means, as gaze of the first eye and the second eye keeps changing. Processing the gaze-tracking data to determine the first gaze direction and the second gaze direction of the first eye and second eye, respectively, is well-known in the art. Optionally, the gaze tracking means is a part of a display apparatus worn by the user.

Throughout the present disclosure, the term "depth map" refers to a two-dimensional (2D) image that represents or encodes depth or distance information of a field of view of the user. In other words, the depth map denotes at what distance from the user's head is each object located in the field of view of the user. Notably, the depth map is created using a depth sensor. Optionally, the depth sensor is a part of a display apparatus worn by the user. Throughout the present disclosure, the term "marching" refers to a rendering and computational technique that simulates traversal of a given ray through a three-dimensional (3D) environment. Notably, marching the first ray and the second ray enables to simulate the traversal of the first ray through the depth map in the first gaze direction and the second ray through the depth map in the second gaze direction. It will be appreciated that marching the first ray and second ray allows to render data about objects that lie in path of the first ray and the second ray respectively. Herein, while marching the first ray, it is detected when the first ray coincides with any object or surface for a first time (which is a point at which the first eye of the user is gazing at). Subsequently, using data from the depth map, depth (i.e., distance) of that object or surface from the first eye is determined as the first optical depth corresponding to the first eye. Notably, the first optical depth is a distance of that point at which the first eye is gazing at, from the first eye. Similarly, while marching the second ray, it is detected when the second ray coincides with any object or surface for a first time (which is a point at which the second eye of the user is gazing at). Subsequently, using data from the depth map, depth (i.e., distance) of that object or surface from the second eye is determined as the second optical depth corresponding to the second eye. Notably, the second optical depth is a distance of that point at which the second eye of the user is gazing at, from the second eye.

Optionally, the step of marching comprises:

detecting when no valid optical depth is available in the depth map for at least one of: the first ray, the second ray; and when it is detected that no valid optical depth is available in the depth map for at least one of: the first ray, the second ray, performing a neighbourhood search in the depth map in a whorled pattern around the at least one of: the first ray, the second ray, to determine at least one of: the first optical depth, the second optical depth corresponding to the at least one of: the first ray, the second ray.

In this regard, the term "valid optical depth" refers to that optical depth in the depth map that is considered to be accurate and reliable. Notably, the valid optical depth adheres to physical constraints and properties of the real world, such as the valid optical depth is a non-negative value and remain less than a maximum measurable range of a sensor used that is used to create the depth map. It will be appreciated that no valid optical depth is detected to be available in the depth map when all the optical depths in the depth map fail to meet certain criteria required for those optical depths to be considered accurate and reliable. For example, if all the optical depths in the depth map are either negative or greater than the maximum measurable range of the sensor that is used to create the depth map, then no valid optical depth is detected to be available in the depth map.

In an exemplary scenario, where a time-of-flight depth sensor is used to create the depth map, two or more light modulation frequencies. Subsequently, if a measured depth value for a pixel is physically not possible for the two or more light modulation frequencies, then that depth value is considered as invalid. Similarly, the depth values that are measured from large distances due to presence of stray light are also considered as invalid.

In another exemplary scenario, disparity stereo algorithms are used to perform disparity flow estimates from the first eye to the second eye, and the second eye to the first eye. If a cross-flow in the disparity flow estimates are reliable then the depth samples are considered as valid. Similarly, if the cross-flow in the disparity flow estimates are unreliable then the depth samples are considered as invalid.

In an implementation, when no valid optical depth is detected to be available in the depth map for the first ray, then the neighbourhood search is performed in the depth map in the whorled pattern around the first ray. In another implementation, when no valid optical depth is detected to be available in the depth map for the second ray, then the neighbourhood search is performed in the depth map in the whorled pattern around the second ray. In yet another implementation, when no valid optical depth is detected to be available in depth map for the first ray and the depth map for the second ray, then the neighbourhood search is performed in the depth map in the whorled pattern around the first ray and the second ray, respectively. Throughout the present disclosure, the term "whorled pattern" refers to a pattern or arrangement that either spirals or radiates outwards from a reference point, or comprises concentric circles or rings of increasing radii around the reference point. Notably, performing the neighbourhood search in the depth map in the whorled pattern around the at least one of: the first ray, and the second ray, is done by propagating and searching via spiralling or radiating outwards from a direction of the at least one of: the first ray, the second ray, or via moving in concentric circles or rings of increasing radii around the direction of the at least one of: the first ray, the second ray till the at least one of: the first optical depth, the second optical depth is found. A technical effect is that the at least one of: the first optical depth, the second optical depth is accurately determined even in a scenario when no valid optical depth is detected to be available in the depth map for the at least one of: the first ray, the second ray.

Optionally, the neighbourhood search is performed by limiting an angular width of the whorled pattern to a first predefined threshold angle. Throughout the present disclosure, the term "angular width" refers to an angle that defines either an extent to which the whorled pattern spirals or radiates outwards, or an extent of a radius of an outermost concentric circle or ring in the whorled pattern. Throughout the present disclosure, the term "first predefined threshold angle" refers to a maximum threshold value for the angular width of the whorled pattern, which the whorled pattern cannot exceed. Notably, limiting the angular width of the whorled pattern to the first predefined threshold angle puts a limit to an area within in which the neighbourhood search is performed. For example, the angular width of the whorled pattern is limited to the first predefined threshold angle of 4 degrees. A technical effect of limiting the angular width of the whorled pattern to the first predefined threshold angle is that a time for performing the neighbourhood search is reduced as the neighbourhood search is done in only in a limited area.

Optionally, the neighbourhood search is performed by limiting an angular width of the whorled pattern to a second predefined threshold angle, and wherein the neighbourhood search is performed until an optical depth is found within another predefined threshold percent from the gaze convergence distance, and the at least one of: the first optical depth, the second optical depth is determined as said optical depth that is found within the another predefined threshold percent from the gaze convergence distance. Throughout the present disclosure, the term "second predefined threshold angle" refers to another maximum threshold value for the angular width which is greater than the first predefined threshold value and is used to increase the limited area in which the neighbourhood search is conducted. Notably, the neighbourhood search is performed by limiting the angular width of the whorled pattern is limited to the second predefined threshold in a scenario when the user is gazing past a nearby object and as a result no valid optical depth is available. It will be appreciated that the neighbourhood search is performed to find the optical depth from a suitable point near the gaze convergence point, where the gaze convergence point provides an idea about the direction in which the user is gazing at. Subsequently, the optical depth that is found needs to be close enough to the gaze convergence distance for the optical depth to be suitable for being determined as the at least one of: the first optical depth, the second optical depth. Throughout the present disclosure, the term "another predefined threshold percent" refers to that reference value which is used to determine how close the optical depth is to the gaze convergence distance. Optionally, the another predefined threshold percent is same as the predefined threshold percent. Alternatively, the another predefined threshold percent is different from the predefined threshold percent. In this regard, if a percentage calculated from a difference between the gaze convergence distance and the optical depth is less than the another predefined threshold percent, then the optical depth is found to be within the another predefined threshold percent. A technical effect is that the optical depth is effectively found by using a larger area for preforming the neighbourhood search by limiting the angular width of the whorled pattern to the second predefined threshold angle to increase a probability of finding the optical depth by performing the neighbourhood search.

Optionally, if no valid optical depth is found in the depth map for the at least one of: the first ray, the second ray after performing the neighbourhood search, the at least one of: the first optical depth, the second optical depth is determined as the gaze convergence distance. In this regard, when no valid optical depth is found in the depth map for the at least one of: the first ray, the second ray after performing the neighbourhood search, then determining the at least one of: the first optical depth, the second optical depth as the gaze convergence distance is a most suitable approach as the gaze convergence distance provides an appropriate estimation of the point where the user is gazing at.

Throughout the present disclosure, the term "gaze convergence distance" refers to a distance from the user's eyes to a point at which the first gaze direction and the second gaze direction converge. In other words, the gaze convergence distance represents an optical depth at which the user is gazing. It will be appreciated that since an angle of convergence of the first gaze direction and the second gaze direction, an interpupillary distance (IPD) of the user's eyes, a point of convergence of said first gaze direction and said second gaze direction are already known, the gaze convergence distance can be easily calculated, for example, using at least one mathematical technique. The at least one mathematical technique could be at least one of: a triangulation technique, a geometry-based technique, a trigonometry-based technique. The IPD of the user's eyes can be an average IPD. Calculating the gaze convergence distance, based on the convergence of the first gaze direction and second gaze direction is well-known in the art.

Throughout the present disclosure, the term "predefined threshold percent" refers to a numerical value that is used for determining how similar or close are values of the first optical depth and the second optical depth. In this regard, a difference between the first optical depth and the second optical depth is calculated and used to calculate a differential percentage between the first optical depth and the second optical depth. Subsequently, if the calculated differential percentage is less than the predefined threshold percent value, then the first optical depth lies within the predefined threshold percent from the second optical depth. For example, if the predefined threshold percent is 10 percent and the calculated differential percentage between the first optical depth and the second optical depth is 8 percent, then the first optical depth is within the predefined threshold percent of the second optical depth. Notably, if the first optical depth is within the predefined threshold percent of the second optical depth, then those points from which the first optical depth and the second optical depth are calculated, lie in close proximity to each other. Throughout the present disclosure, the term "given focus distance" refers to a specific value of focal length that is determined for at least one variable focus camera. Subsequently, the at least one variable focus camera is then operated at the given focus distance for capturing images of the region of interest at which the user is gazing. It will be appreciated that the given focus distance is an optimal focal length for capturing images of highest clarity of the region of interest at which the user is gazing, in comparison for other focal lengths corresponding to the region of interest. It will be appreciated that since it is detected that the first optical depth lies within the predefined threshold percent from the second optical depth, the points at which the first eye and the second eye of the user are gazing at, respectively, and the gaze convergence point, all lie in the close proximity to each other in the region of interest where the user is gazing at. Subsequently, the given focus distance is suitable to be determined by taking into consideration the points at which the first eye and the second eye of the user are gazing at, respectively, and the gaze convergence point. Notably, selecting the given focus distance as the average of the at least two of: the first optical depth, the second optical depth, the gaze convergence distance, enables to take into consideration at least two of: the point at which the first eye of the user is gazing at, the point at which the first eye of the user is gazing at, the gaze convergence point. In an implementation, the given focus distance is selected as the average of the first optical depth and the second optical depth. In another implementation, the given focus distance is selected as the average of the first optical depth and the gaze convergence distance. In yet another implementation, the given focus distance is selected as the average of the second optical depth and the gaze convergence distance. In still another implementation, the given focus distance is selected as the average of the first optical depth, the second optical depth and the gaze convergence distance.

Throughout the present disclosure, the term "variable-focus camera" refers to a type of camera whose focal length is adjustable to be set to different values. Notably, the focal length of the at least one variable-focus camera being adjustable makes the at least one variable-focus camera suitable to be used in Mixed Reality (MR) applications that require high quality images being taken at different focal lengths. It will be appreciated that the term "at least one variable-focus camera" refers to "one variable-focus camera" in some implementations, and "a plurality of variable-focus cameras" in other implementations. Throughput the present disclosure, the term "given image" refers to a specific image that is captured using the at least one variable-focus camera, when the focal length of the at least one variable-focus camera is selected to be of the given focus distance. Notably, the given image is suitable for providing an immersive experience to the user in the MR applications as the given image is of highest quality for the region of interest which the user is gazing at.

Optionally, when it is detected that the first optical depth does not lie within the predefined threshold percent from the second optical depth, selecting the given focus distance as one of the first optical depth and the second optical depth that is closer to the gaze convergence distance than another of the first optical depth and the second optical depth. In this regard, since the first optical depth does not lie within the predefined threshold percent from the second optical depth, the point where the first eye of the user is gazing at and the point where the second eye of the user is gazing at, does not lie in close proximity of each other. Subsequently, if the first optical depth is closer to the gaze convergence distance in comparison to the second optical depth, then the point where the first eye of the user is gazing at lies closer to the gaze convergence distance in comparison to the point where the second eye of the user is gazing at, and thus, the first optical depth is more suitable to be selected as the given focus distance in comparison to the second optical depth. Similarly, if the second optical depth is closer to the gaze convergence distance in comparison to the first optical depth, then the point where the second eye of the user is gazing at lies closer to the gaze convergence distance in comparison to the point where the first eye of the user is gazing at, and thus, the second optical depth is more suitable to be selected as the given focus distance in comparison to the first optical depth. For example, if the first optical distance is determined to be 4 metres, the second optical distance is determined to be 8 metres and the gaze convergence distance is calculated to be 5 metres, then the first optical distance is selected as the given focus as the first optical distance is closer to the gaze convergence distance in comparison to the second optical distance. A technical effect of selecting the given focus distance as one of the first optical depth and the second optical depth that is closer to the gaze convergence distance is that the given focus distance is effectively and accurately selected even in a scenario when the first optical depth does not lie within the predefined threshold percent from the second optical depth.

Optionally, when it is detected that the first optical depth does not lie within the predefined threshold percent from the second optical depth, selecting the given focus distance as one of the first optical depth and the second optical depth that corresponds to a dominant eye out of the first eye and the second eye. Throughout the present disclosure, the term "dominant eye" refers to an eye of the user whose visual input is preferred to that of another eye of the user. The dominant eye may be either the first eye of the user or the second eye of the user. Optionally, the method further comprises receiving information indicative of the dominant eye or determining the dominant eye from amongst the first eye and the second eye. Notably, determining the dominant eye of the user is well-known in the art. Subsequently, if the first eye of the user is the dominant eye, then the first optical depth is selected as the given focus distance. Similarly, if the second eye of the user is the dominant eye, then the second optical depth is selected as the given focus distance. It will be appreciated that when it is detected that the first optical depth does not lie within the predefined threshold percent from the second optical depth, then the optical depth of the dominant eye from amongst the first eye and the second eye is most suitable to be used as the given focus distance, as it is the dominant eye whose visual input is preferred over the other eye. A technical effect of selecting the given focus length as the optical depth corresponding to the dominant eye enables to make efficient and accurate selection of the given focus length based on the dominant eye whose visual input is preferred over the other eye.

Optionally, the method further comprises:

detecting when no gaze direction is available for any of the first eye and the second eye; and when it is detected that no gaze direction is available for any of the first eye and the second eye, marching a given ray along a forward direction from another given viewpoint into the depth map, to determine an optical depth, and selecting the given focus distance as the determined optical depth.

In this regard, no gaze direction is available for any of the first eye and the second eye when the data of the gaze tracking means is incorrect or unreliable for any of the first eye and the second eye, and subsequently, the gaze tracking means is unable to determine the gaze direction for any of the first eye and the second eye. Throughout the present disclosure, the term "forward direction" refers to a direction along a perpendicularly outward axis from the another given viewpoint of the user towards an infinite distance. Optionally, the forward direction is default gaze direction in which the user is gazing at. Throughout the present disclosure, the term "another given viewpoint" refers to a position and/or orientation of the user's head at a time instance when no gaze direction is available for any of the first eye and the second eye. Notably, marching the ray into the depth map in the forward direction enables to determine the optical depth in a direction in which the user is looking at and hence, is most suitable to find the optical depth. Optionally, performing the ray marching along the forward direction encompasses performing the neighbourhood search in the whorled pattern around the forward direction. Optionally, the depth map used for ray marching along the forward direction is same as the depth map used for ray marching along the first ray and the second ray. Subsequently, the given focus distance is selected as the determined optical depth to ensure that the captured given image is of highest clarity for the region of interest in a forward direction of the user. A technical effect is that the given focus distance is effectively selected even in a scenario when no gaze direction is available for any of the first eye and the second eye.

Optionally, if no valid optical depth is found in the depth map after marching the given ray along the forward direction, the given focus distance is selected as a previous focus distance employed for capturing a previous image. Notably, no valid optical depth being found even after marching the given ray along the forward direction, indicates that no appropriate way is available to find the region of interest towards which the user is gazing. Subsequently, the given focus distance is selected as the previous focus distance that was employed for capturing the previous image. Throughout the present disclosure, the term "previous image" refers to that image which was captured by the at least one variable focus camera at a moment of time that occurred before an implementation of the method started. Throughout the present disclosure, the term "previous focus distance" refers to the focal length used by the at least one variable focus camera for capturing the previous image. A technical effect of selecting the given focus distance as the previous focus distance is that a consistent visual experience is provided to the user in MR applications, even in those scenarios where the method is unable to select the given focus distance based on the region of interest at which the user is currently gazing at.

Optionally, the method further comprises:
detecting when a gaze direction is available for only one of the first eye and the second eye; and
when it is detected that the gaze direction is available for only one of the first eye and the second eye,
a given ray along said gaze direction from yet another marching given viewpoint into the depth map, to determine one optical depth corresponding to the one of the first eye and the second eye;
marching another given ray along a forward direction from the yet another given viewpoint into the depth map, to determine another optical depth corresponding to another of the first eye and the second eye;
detecting whether the one optical depth lies within the predefined threshold percent from the another optical depth; and
when it is detected that the one optical depth lies within the predefined threshold percent from the another optical depth, selecting the given focus distance as an average of the one optical depth and the another optical depth.

In this regard, the term "yet another given viewpoint" refers to that position and/or orientation of the user's head from which the gaze direction is available for only one of the first eye and the second eye. Subsequently, based on for which one of the first eye or the second eye, the gaze direction is available, the ray marching of the given ray is performed along the gaze direction of that eye, so that the one optical depth is determined corresponding to that eye for which the gaze direction is available. Moreover, the ray marching of the another given ray is performed in the forward direction from the yet another given viewpoint into the depth map to detect the another optical depth, as no gaze direction in available for the another of the first eye and the second eye. Notably, detecting whether the one optical depth lies within the predefined threshold percent from the another optical depth enables to determine how close are the one optical depth and the another optical depth are to each other. Subsequently, a percentage of difference between the one optical depth and the another optical depth is compared with the predefined threshold percent, and detected if the percentage of difference between the one optical depth and the another optical depth is less than the predefined threshold percent. If the percentage of difference between the one optical depth and the another optical depth is less than the predefined threshold percent then the one optical depth is detected to lies within the predefined threshold percent from the another optical depth. It will be appreciated that when it is detected that the one optical depth lies within the predefined threshold percent from the another optical depth, then those points in the region of interest of the user from where the one optical depth and the another optical depth are determined lie in close proximity to each other. Subsequently, selecting the given focus distance as the average of the one optical depth and the another optical depth provides optimum distance between the one optical depth and the another optical depth to be selected as the given focus distance. A technical effect is that the given focus distance is effectively and accurately selected even when the gaze direction is not available for one of the first eye and the second eye by performing ray marching in the forward direction from the one of the first eye and second eye for which the gaze direction is not available.

Optionally, if no valid optical depth is found in the depth map after marching the given ray along said gaze direction and after marching the another given ray along the forward direction, the given focus distance is selected as a previous focus distance employed for capturing a previous image. In this regard, there is no appropriate way to find the region of interest towards which the user is gazing at in the present moment of time, and subsequently, the given focus distance cannot be selected for the region of interest towards which the user is gazing at in the present moment of time. Notably, marching the given ray along said gaze direction encompasses performing the neighbourhood search in the whorled pattern around the gaze direction. Similarly, marching the another given ray along the forward direction encompasses performing the neighbourhood search in the whorled pattern around the forward direction A technical effect of selecting the given focus distance as the previous focus distance employed for capturing the previous image enables in maintaining a continuity in capturing images from the at least one variable-focus camera for MR applications.

Optionally, the method further comprises:
detecting when a gaze direction is available for only a dominant eye out of the first eye and the second eye; and when it is detected that the gaze direction is available for only the dominant eye, marching a given ray along said gaze direction from yet another given viewpoint into the depth map, to determine an optical depth corresponding to the dominant eye; and selecting the given focus distance as the optical depth corresponding to the dominant eye.

In this regard, since the visual input of the dominant eye of the user is preferred over the other eye, the gaze direction may also be available for only the dominant eye out of the first eye and the second eye. Subsequently, the marching of the given ray is also performed only along the gaze direction of the dominant eye, where the optical depth is determined using the depth map from a point where the given ray coincides with. Notably, the determined optical depth is an optimal focal length to be selected as the given focus distance for the at least one variable-focus camera. A technical effect is that the implementation of the method is simplified as only the gaze direction of the dominant eye is considered for selecting the given focus distance.

The present disclosure also relates to the system as described above. Various embodiments and variants disclosed above, with respect to the aforementioned computer-implemented method, apply mutatis mutandis to the system.

Throughout the present disclosure, the term "processor" refers to a computational element that is operable to execute operations of the aforementioned system. Examples of the processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, one or more individual processors, processing devices and elements are arranged in various architectures for responding to and processing the instructions that execute the system. Notably, the at least one processor controls an overall operation of the system.

Optionally, the system further comprises a gaze-tracking means and a depth sensor. In such a case, the system is implemented in a display apparatus worn by a user itself. A technical effect is that a design of the system is simplified and made compact by implementing all components of the system in the display apparatus itself.

Optionally, to perform the step of marching, the processor is configured to:

detect when no valid optical depth is available in the depth map for at least one of: the first ray, the second ray; and when it is detected that no valid optical depth is available in the depth map for at least one of: the first ray, the second ray, perform a neighbourhood search in the depth map in a whorled pattern around the at least one of: the first ray, the second ray, to determine at least one of: the first optical depth, the second optical depth corresponding to the at least one of: the first ray, the second ray.

In this regard, a technical effect is that the at least one of: the first optical depth, the second optical depth is accurately determined even in a scenario when no valid optical depth is detected to be available in the depth map for the at least one of: the first ray, the second ray.

Optionally, wherein to perform the neighbourhood search, the processor is configured to at least one of:

limit an angular width of the whorled pattern to a first predefined threshold angle;

limit an angular width of the whorled pattern to a second predefined threshold angle, and wherein in this regard, the neighbourhood search is performed until an optical depth is found within another predefined threshold percent from the gaze convergence distance, and the at least one of: the first optical depth, the second optical depth is determined as said optical depth that is found within the another predefined threshold percent from the gaze convergence distance.

In this regard, a technical effect of limiting the angular width of the whorled pattern to the first predefined threshold angle is that a time for performing the neighbourhood search is reduced as the neighbourhood search is done in only in a limited area. Another technical effect is that the optical depth is effectively found by using a larger area for preforming the neighbourhood search by limiting the angular width of the whorled pattern to the second predefined threshold angle to increase a probability of finding the optical depth by performing the neighbourhood search.

DETAILED DESCRIPTION OF THE DRAWINGS

Referring to FIG. 1, illustrated is a flowchart 100 depicting steps of a computer-implemented method, in accordance with an embodiment of the present disclosure. At step 102, a first ray and a second ray are marched, along a first gaze direction and a second gaze direction that are estimated using a gaze-tracking means, from a given viewpoint into a depth map, to determine a first optical depth and a second optical depth corresponding to a first eye and a second eye, respectively. At step 104, a gaze convergence distance is calculated, based on the first gaze direction and the second gaze direction. At step 106, whether the first optical depth lies within a predefined threshold percent from the second optical depth is detected. At step 108, when it is detected that the first optical depth lies within the predefined threshold percent from the second optical depth, a given focus distance is selected as an average of at least two of: the first optical depth, the second optical depth, the gaze convergence distance. At step 110, the given focus distance is employed for capturing a given image using at least one variable-focus camera.

Figure 2:
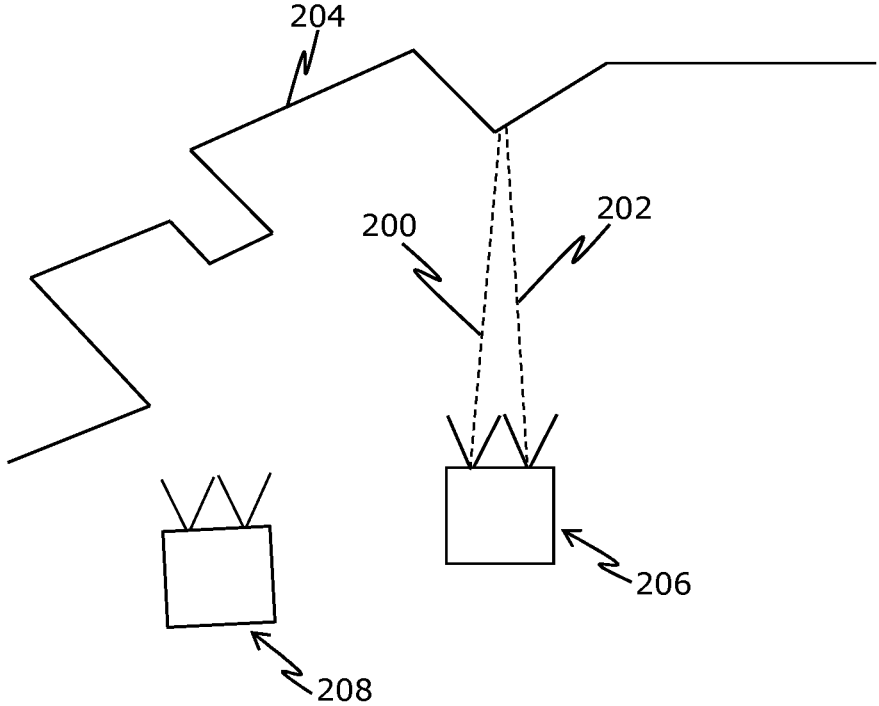
FIG. 2 is a schematic illustration of an implementation scenario of ray marching of a first ray and a second ray, in accordance with an embodiment of the present disclosure.

Referring to FIG. 2, illustrated is a schematic illustration of an implementation scenario of ray marching of a first ray 200 and a second ray 202, in accordance with an embodiment of the present disclosure. As shown, the first ray 200 is marched along a first gaze direction and the second ray 202 is marched along a second gaze direction from a given viewpoint 206 into a depth map 204. Herein, the depth map 204 is calculated from a previous viewpoint 208.

Figure 3:
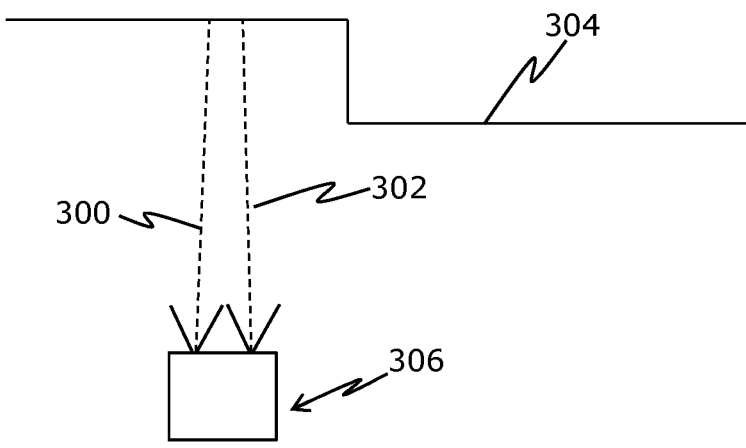
FIG. 3 is a schematic illustration of an implementation scenario of ray marching of a first ray and a second ray, in accordance with an embodiment of the present disclosure.

Referring to FIG. 3, illustrated is a schematic illustration of an implementation scenario of ray marching of a first ray 300 and a second ray 302, in accordance with an embodiment of the present disclosure. As shown, the first ray 300 is marched along first gaze direction and the second ray 302 is marched along a second gaze direction from a given viewpoint 306 into a depth map 304. Subsequently, a first optical depth and a second optical depth are determined to be of similar lengths, from the marching of the first ray 300 and the second ray 302, respectively.

Figure 4:
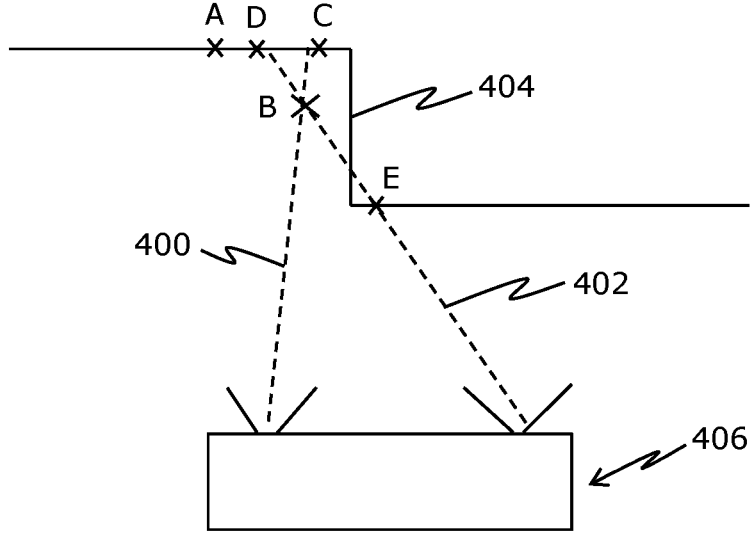
FIG. 4 is a schematic illustration of an implementation scenario of ray marching of a first ray and a second ray, in accordance with an embodiment of the present disclosure.

Referring to FIG. 4, illustrated is a schematic illustration of an implementation scenario of ray marching of a first ray 400 and a second ray 402, in accordance with an embodiment of the present disclosure. As shown, the first ray 400 is marched along first gaze direction and the second ray 402 is marched along a second gaze direction from a given viewpoint 406 into a depth map 404. Herein, a valid optical depth A is determined for a first eye, where the valid optical depth A is selected as a given focus distance because the valid optical depth A is closer to a gaze convergence distance B. Moreover, optical depths C and D are determined to be invalid because the optical depths C and D are determined as a result of stray lighting. Furthermore, an optical depth E determined for a second eye is invalid as the optical depth E determined for the second eye does not agree with the valid optical depth A determined for the first eye and is distant from the gaze convergence distance B. In such case, a neighbourhood search in whorled pattern is performed around the second ray 402.

Figure 5:
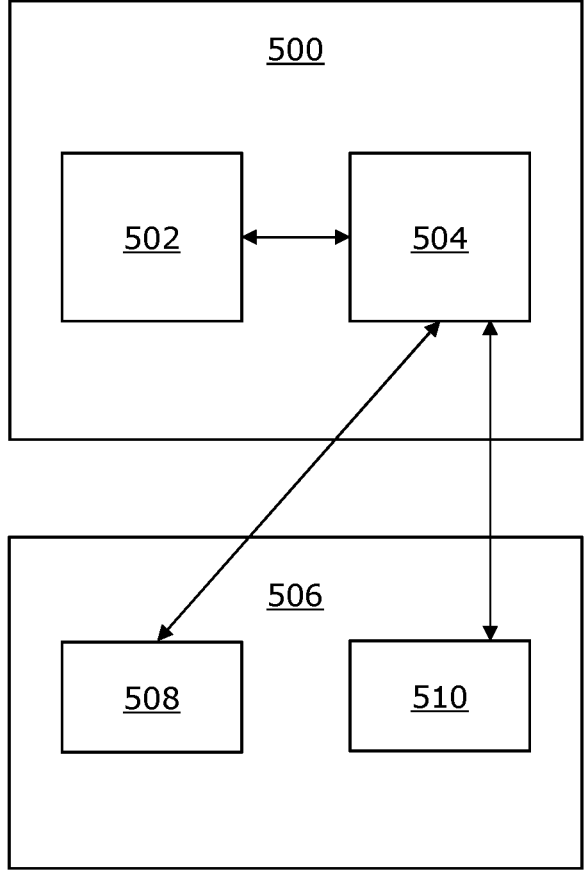
FIG. 5 is an illustration of an environment for implementing a system, in accordance with an embodiment of the present disclosure.

Referring to FIG. 5, illustrated is an environment for implementing a system 500. As shown, the system 500 comprises at least one variable-focus camera (depicted as a variable-focus camera 502). Moreover, the system 500 comprises a processor 504. Herein, the processor 504 is communicably coupled to a gaze-tracking means 508 to receive gaze-tracking data, wherein the gaze-tracking means 508 is a part of a display apparatus 506. Moreover, the processor 504 is communicably coupled to a depth sensor 510 to receive depth map, wherein the depth sensor 510 is a part of the display apparatus 506.

It may be understood by a person skilled in the art that FIG. 1 includes a simplified architecture of the system 500, for sake of clarity, which should not unduly limit the scope of the claims herein. It is to be understood that the specific implementation of the system 500 is provided as an example and is not to be construed as limiting it to specific numbers or types of variable-focus cameras, and processors. The person skilled in the art will recognize many variations, alternatives, and modifications of embodiments of the present disclosure.

Figure 6:
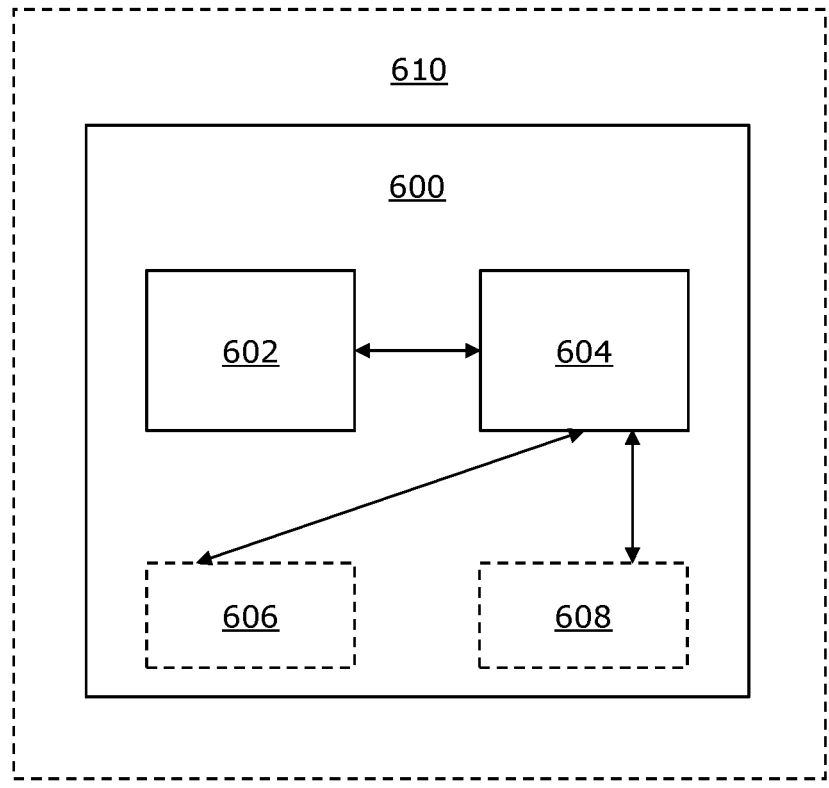
FIG. 6 is an illustration of a block diagram of an implementation scenario of a system, in accordance with an embodiment of the present disclosure.

Referring to FIG. 6, illustrated is a block diagram of an implementation scenario of a system 600, in accordance with an embodiment of the present disclosure. As shown, the system 600 comprises at least one variable-focus camera (depicted as a variable-focus camera 602). Moreover, the system 600 comprises a processor 604. Optionally, the system 600 further comprises a gaze-tracking means 606 and a depth sensor 608, wherein the gaze-tracking means 606 and the depth sensor 608 are a part of a display apparatus 610. In such a scenario, the system 600 is a part of the display apparatus 610, itself. Furthermore, the processor 604 is communicably coupled to a gaze-tracking means 606 to receive gaze-tracking data, and the processor 604 is communicably coupled to a depth sensor 608 to receive depth map.

The invention claimed is:

1. A computer-implemented method comprising:
marching a first ray and a second ray, along a first gaze direction and a second gaze direction that are estimated using a gaze-tracking means, from a given viewpoint into a depth map, to determine a first optical depth and a second optical depth corresponding to a first eye and a second eye, respectively;
calculating a gaze convergence distance, based on the first gaze direction and the second gaze direction;
detecting whether the first optical depth lies within a predefined threshold percent from the second optical depth; and
when it is detected that the first optical depth lies within the predefined threshold percent from the second optical depth, selecting a given focus distance as an average of at least two of: the first optical depth, the second optical depth, the gaze convergence distance; and
employing the given focus distance for capturing a given image using at least one variable-focus camera.

2. The method of claim 1, wherein the step of marching comprises:
detecting when no valid optical depth is available in the depth map for at least one of: the first ray, the second ray; and
when it is detected that no valid optical depth is available in the depth map for at least one of: the first ray, the second ray, performing a neighbourhood search in the depth map in a whorled pattern around the at least one of: the first ray, the second ray, to determine at least one of: the first optical depth, the second optical depth corresponding to the at least one of: the first ray, the second ray.

3. The method of claim 2, wherein the neighbourhood search is performed by limiting an angular width of the whorled pattern to a first predefined threshold angle.

4. The method of claim 2, wherein the neighbourhood search is performed by limiting an angular width of the whorled patten to a second predefined threshold angle, and wherein the neighbourhood search is performed until an optical depth is found within another predefined threshold percent from the gaze convergence distance, and the at least one of: the first optical depth, the second optical depth is determined as said optical depth that is found within the another predefined threshold percent from the gaze convergence distance.

5. The method of claim 4, wherein if no valid optical depth is found in the depth map for the at least one of: the first ray, the second ray after performing the neighbourhood search, the at least one of: the first optical depth, the second optical depth is determined as the gaze convergence distance.

6. The method of claim 1, further comprising:
when it is detected that the first optical depth does not lie within the predefined threshold percent from the second optical depth, selecting the given focus distance as one of the first optical depth and the second optical depth that is closer to the gaze convergence distance than another of the first optical depth and the second optical depth.

7. The method of claim 1, further comprising:
when it is detected that the first optical depth does not lie within the predefined threshold percent from the second optical depth, selecting the given focus distance as one of the first optical depth and the second optical depth that corresponds to a dominant eye out of the first eye and the second eye.

8. The method of claim 1, further comprising:
detecting when no gaze direction is available for any of the first eye and the second eye; and
when it is detected that no gaze direction is available for any of the first eye and the second eye, marching a given ray along a forward direction from another given viewpoint into the depth map, to determine an optical depth, and selecting the given focus distance as the determined optical depth.

9. The method of claim 8, wherein if no valid optical depth is found in the depth map after marching the given ray along the forward direction, the given focus distance is selected as a previous focus distance employed for capturing a previous image.

10. The method of claim 1, further comprising:

detecting when a gaze direction is available for only one of the first eye and the second eye; and when it is detected that the gaze direction is available for only one of the first eye and the second eye, marching a given ray along said gaze direction from yet another given viewpoint into the depth map, to determine one optical depth corresponding to the one of the first eye and the second eye;

marching another given ray along a forward direction from the yet another given viewpoint into the depth map, to determine another optical depth corresponding to another of the first eye and the second eye;

detecting whether the one optical depth lies within the predefined threshold percent from the another optical depth; and when it is detected that the one optical depth lies within the predefined threshold percent from the another optical depth, selecting the given focus distance as an average of the one optical depth and the another optical depth.

11. The method of claim 10, wherein if no valid optical depth is found in the depth map after marching the given ray along said gaze direction and after marching the another given ray along the forward direction, the given focus distance is selected as a previous focus distance employed for capturing a previous image.

12. The method of claim 1, further comprising:

detecting when a gaze direction is available for only a dominant eye out of the first eye and the second eye; and when it is detected that the gaze direction is available for only the dominant eye, marching a given ray along said gaze direction from yet another given viewpoint into the depth map, to determine an optical depth corresponding to the dominant eye; and selecting the given focus distance as the optical depth corresponding to the dominant eye.

13. A system comprising:

at least one variable-focus camera; and a processor configured to:

march a first ray and a second ray, along a first gaze direction and a second gaze direction that are estimated using a gaze-tracking means, from a given viewpoint into a depth map, to determine a first optical depth and a second optical depth corresponding to a first eye and a second eye, respectively;

calculate a gaze convergence distance, based on the first gaze direction and the second gaze direction;

detect whether the first optical depth lies within a predefined threshold percent from the second optical depth; and when it is detected that the first optical depth lies within the predefined threshold percent from the second optical depth, select a given focus distance as an average of at least two of: the first optical depth, the second optical depth, the gaze convergence distance; and employ the given focus distance for capturing a given image using the at least one variable-focus camera.

14. The system of claim 13, wherein to perform the step of marching, the processor is configured to:

detect when no valid optical depth is available in the depth map for at least one of: the first ray, the second ray; and when it is detected that no valid optical depth is available in the depth map for at least one of: the first ray, the second ray, perform a neighbourhood search in the depth map in a whorled pattern around the at least one of: the first ray, the second ray, to determine at least one of: the first optical depth, the second optical depth corresponding to the at least one of:

the first ray, the second ray.

15. The system of claim 14, wherein to perform the neighbourhood search, the processor is configured to at least one of:

limit an angular width of the whorled pattern to a first predefined threshold angle;

limit an angular width of the whorled patten to a second predefined threshold angle, and wherein in this regard, the neighbourhood search is performed until an optical depth is found within another predefined threshold percent from the gaze convergence distance, and the at least one of: the first optical depth, the second optical depth is determined as said optical depth that is found within the another predefined threshold percent from the gaze convergence distance.

\* \* \* \* \*